US012780176B2

(12) United States Patent
Habbani et al.

(10) Patent No.: US 12,780,176 B2
(45) Date of Patent: Nov. 3, 2026

(54) METHOD FOR CONTROLLING THE STARTING OF A HEAT ENGINE IN A VEHICLE EQUIPPED WITH A HYBRID TRANSMISSION

(71) Applicant: STELLANTIS AUTO SAS, Poissy (FR)

(72) Inventors: Ridouane Habbani, Asnieres sur Seine (FR); Cedric Launay, Epone (FR); Yohan Milhau, Orgeval (FR); Gaetan Rocq, La Boissiere Ecole (FR)

(73) Assignee: STELLANTIS AUTO SAS, Poissy (FR)

( * ) Notice: Subject to any disclaimer, the term of this patent is extended or adjusted under 35 U.S.C. 154(b) by 0 days.

(21) Appl. No.: 19/152,851

(22) PCT Filed: Jan. 11, 2024

(86) PCT No.: PCT/FR2024/050035

§ 371 (c)(1),
(2) Date: Jul. 31, 2025

(87) PCT Pub. No.: WO2024/170832

PCT Pub. Date: Aug. 22, 2024

(65) Prior Publication Data

US 2026/0109338 A1 Apr. 23, 2026

(30) Foreign Application Priority Data

Feb. 14, 2023 (FR) ...................................... 2301355

(51) Int. Cl.
*B60W 20/40* (2016.01)
*B60K 6/24* (2007.10)
(Continued)

(52) U.S. Cl.
CPC ............... *B60W 20/40* (2013.01); *B60K 6/24* (2013.01); *B60K 6/26* (2013.01); *B60K 6/36* (2013.01);
(Continued)

(58) Field of Classification Search
CPC ...... B60W 20/40; B60W 10/02; B60W 10/06; B60W 2510/0275; B60W 2510/0652;
(Continued)

(56) References Cited

U.S. PATENT DOCUMENTS

2017/0246948 A1 8/2017 Reuschel

FOREIGN PATENT DOCUMENTS

DE 102012007322 A1 10/2013
DE 102012009481 A1 11/2013
(Continued)

OTHER PUBLICATIONS

International Search Report and Written Opinion for Priority Application PCT/FR2024/050035 mailed Apr. 17, 2024.

*Primary Examiner* — Rachid Bendidi
*Assistant Examiner* — Hana Victoria Hall
(74) *Attorney, Agent, or Firm* — Sandberg Phoenix & von Gontard, PC

(57) ABSTRACT

The method for controlling the starting of an internal combustion engine (MT) is implemented in an electric hybrid vehicle having a powertrain (eGMP) comprising the internal combustion engine and a hybrid transmission system (eTR), the transmission system having a rotating electric machine (ME) that is coupled to the engine via a clutch device (K0). According to the invention, the method comprises, during a phase for starting the engine with the electric machine while the vehicle is rolling, controlling (M_EB) the clutch by means of a maximum clutch torque setpoint determined according to a predetermined maximum speed gradient
(Continued)

(LGR) and a moment of inertia (Jmth) of the engine, and controlling (M_MT) the engine by means of a maximum engine torque setpoint (CM) determined according to a difference (EC) between the maximum clutch torque setpoint and a torque (C0*e*) transmitted by the clutch.

6 Claims, 3 Drawing Sheets

(51) Int. Cl.

| | |
|---|---|
| ***B60K 6/26*** | (2007.10) |
| ***B60K 6/36*** | (2007.10) |
| ***B60K 6/387*** | (2007.10) |
| ***B60K 6/40*** | (2007.10) |
| ***B60W 10/02*** | (2006.01) |
| ***B60W 10/06*** | (2006.01) |

(52) U.S. Cl.

CPC ................ *B60K 6/387* (2013.01); *B60K 6/40* (2013.01); *B60W 10/02* (2013.01); *B60W 10/06* (2013.01); *B60W 2510/0275* (2013.01); *B60W 2510/0652* (2013.01); *B60W 2520/10* (2013.01); *B60W 2710/027* (2013.01); *B60W 2710/06* (2013.01); *B60W 2710/0666* (2013.01); *B60Y 2200/92* (2013.01); *B60Y 2400/42* (2013.01)

(58) Field of Classification Search

CPC ....... B60W 2520/10; B60W 2710/027; B60W 2710/06; B60W 2710/0666; B60K 6/24; B60K 6/26; B60K 6/36; B60K 6/387; B60K 6/40; B60Y 2200/92; B60Y 2400/42

See application file for complete search history.

(56) References Cited

FOREIGN PATENT DOCUMENTS

| | | | | | |
|---|---|---|---|---|---|
| DE | 102018206057 A1 | * | 10/2019 | ............ | B60W 10/06 |
| EP | 2928746 B1 | * | 2/2017 | ............ | B60W 20/40 |
| KR | 20160047178 A | * | 5/2016 | ............. | B60K 6/387 |
| WO | WO-2018162812 A1 | * | 9/2018 | ............ | B60W 10/06 |

* cited by examiner

[Fig.1]
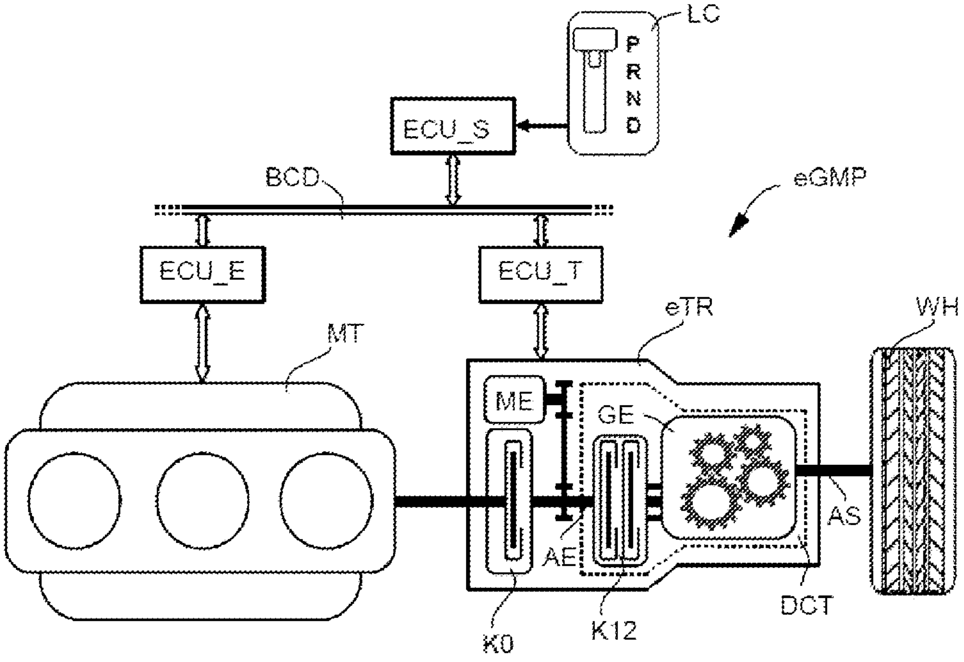

[Fig.2]
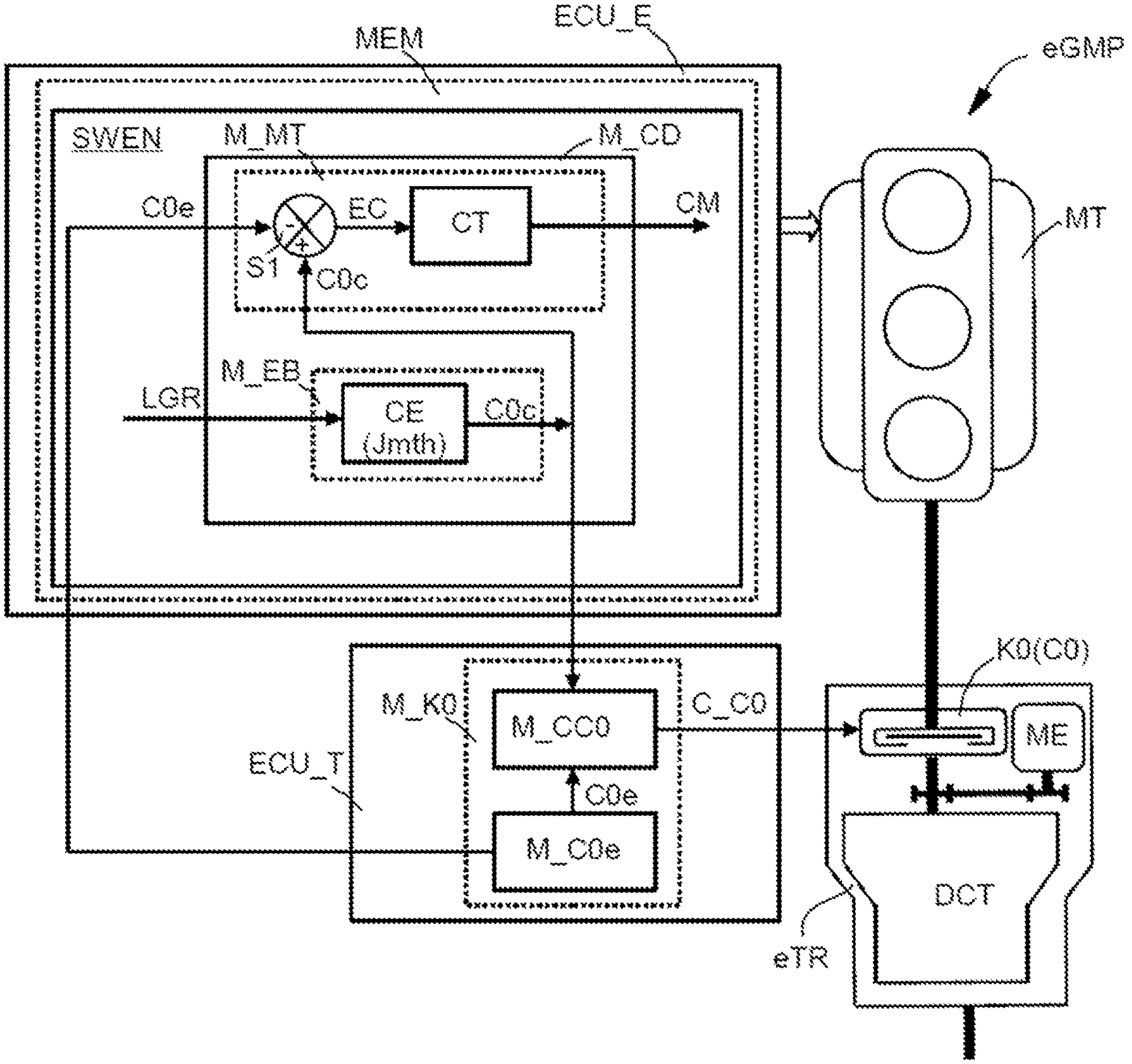

[Fig.3]
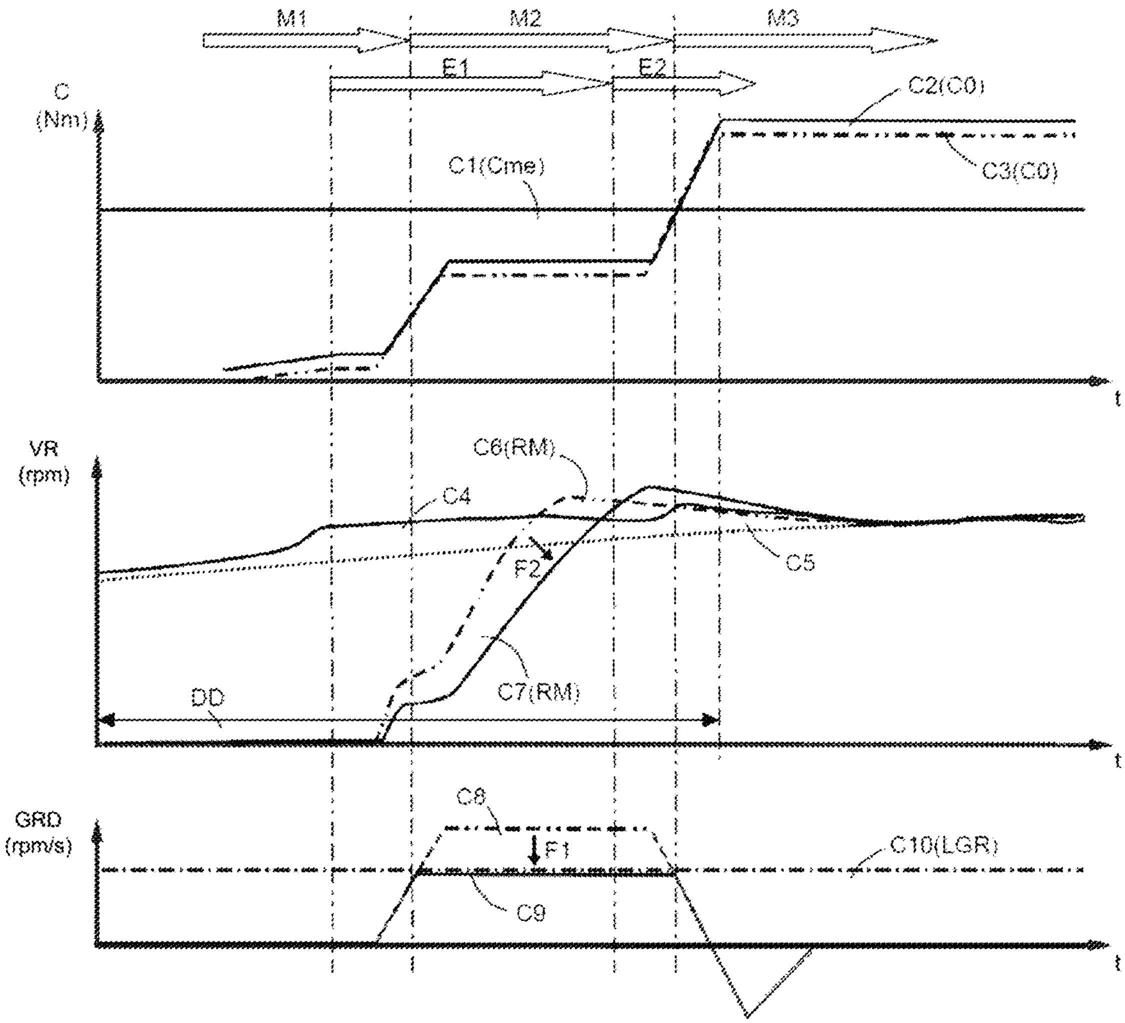

METHOD FOR CONTROLLING THE STARTING OF A HEAT ENGINE IN A VEHICLE EQUIPPED WITH A HYBRID TRANSMISSION

CROSS-REFERENCE TO RELATED APPLICATIONS

This application is the US National Stage under 35 USC § 371 of International Application No. PCT/FR2024/050035, filed Jan. 11, 2024, which claims the priority of French application 2301355 filed on Feb. 14, 2023, the content (text, drawings and claims) of both said applications being incorporated by reference herein.

BACKGROUND

The described methods and devices relate in general to the field of combustion-electric hybrid powertrains for motor vehicles. More particularly, they relate to a method for controlling the starting of an internal combustion engine in a vehicle equipped with a hybrid transmission system.

In hybrid vehicles, electric dual-clutch transmission (eDCT) systems help optimize energy efficiency, reducing fuel consumption and pollutant emissions. Electric dual-clutch transmission (eDCT) systems afford numerous advantages, especially in terms of weight, compactness, energy management flexibility and more. They can be used in various known powertrain architectures, such as mild-hybrid (MHEV), full-hybrid (F) HEV and plug-in hybrid (PHEV) architectures.

FIG. 1 schematically illustrates a hybrid powertrain eGMP for an electric hybrid vehicle. The vehicle considered here is a MHEV, for example, and incorporates three drive modes, namely a thermal drive mode, an electric drive mode and a hybrid drive mode.

The hybrid powertrain eGMP comprises an internal combustion engine MT and an eDCT transmission system, labeled eTR. The transmission system eTR is equipped with an automated manual dual-clutch transmission DCT, a rotating electric machine ME and a clutch device K0.

The transmission DCT typically comprises a duel-clutch device K12 and gear trains GE, and actuators and synchronizers (not shown) for automated manual gear shifting. The transmission DCT receives mechanical drive torque via its input shaft AE in order to rotate the wheels WH of the vehicle coupled to its output shaft AS.

The rotating electric machine ME is mechanically coupled by gearing to the input shaft AE of the transmission DCT in what is referred to as a "P2" architecture. The machine ME is connected to a traction battery (not shown) of the vehicle via a reversible electric power converter (not shown). The machine ME operates in electric motor mode for the electric drive of the vehicle and starting the internal combustion engine MT, and in electric generator mode for electric power generation via drive from the internal combustion engine MT and for regenerative braking.

The clutch device K0 performs a coupling/uncoupling function in the transmission of mechanical torque between the internal combustion engine MT and the transmission system eTR. Thus, with the clutch device K0 open, the internal combustion engine MT is disconnected from the drive train, so that with the machine ME in electric drive mode, and in regenerative braking mode, friction losses due to the internal combustion engine MT are eliminated, for improved energy efficiency. With the dual-clutch device K12 open and the clutch device K0 closed, the machine ME is disconnected from the transmission to the wheels WH and is only engaged with the internal combustion engine MT, allowing the internal combustion engine MT to be started with the machine ME in motor mode and electric power to be generated by the internal combustion engine MT driving the machine ME in generator mode.

The various operating modes and phases of the hybrid powertrain eGMP are managed by a supervisory control unit ECU_S, an engine control unit ECU_E and a transmission control unit ECU_T, which are connected to a data communication bus BCD, typically a "CAN" bus. The supervisory control unit ECU_S is responsible for overall management of the powertrain eGMP, while the control units ECU_E and ECU_T are responsible for close management of the internal combustion engine ME and of transmission system eTR, respectively. The control units ECU_S, ECU_E and ECU_T work together to implement various control strategies depending on the actions of the driver of the vehicle and the situation.

Via the data communication bus BCD, the supervisory control unit ECU_S receives commands from the driver, in particular via a control lever LC operated by the driver, information from the control units of the vehicle and/or information from various sensors, and transmits information and commands to the control units ECU_E and ECU_T for controlling the powertrain eGMP.

In this architecture for the powertrain eGMP, starting or restarting the internal combustion engine MT while the vehicle is rolling is achieved by means of the rotating electric machine ME, which is mechanically coupled to the internal combustion engine ME via the clutch device K0. It is desirable for this starting of the engine to take place in a very short time, typically a few hundred milliseconds, to ensure rapid availability of engine torque and a smooth transition in drive mode, as well as for the comfort of the users of the vehicle. To achieve this, the electric machine ME in motor mode and the clutch device K0 have to apply a high starting torque to the internal combustion engine MT, resulting in a very high speed gradient that can exceed 18000 rpm/s. When starting the internal combustion engine, lubrication thereof is not fully operational. Too high an engine speed gradient risks damaging the internal combustion engine. In the prior art, this situation of starting the internal combustion engine MT while the vehicle is rolling is not optimized. The designer has the choice between limiting the starting torque applied by taking a safety margin, to the detriment of starting time, or violating the speed limitations, with negative consequences for engine life.

Document DE102012009481 A1 describes control of the restarting of an internal combustion engine in a hybrid powertrain. This restart control comprises multiple phases, with a gradual, step-by-step increase in torque. The various control phases take into account the lubrication of the internal combustion engine.

It is desirable to provide an optimized control solution for starting the internal combustion engine of a hybrid vehicle, in particular a MHEV, while rolling, which minimizes starting time and observes the engine speed gradient limit constraint.

SUMMARY

According to a first aspect, disclosed herein is a method for controlling the starting of an internal combustion engine implemented in an electric hybrid vehicle having a powertrain comprising the internal combustion engine and a hybrid transmission system, the hybrid transmission system having a rotating electric machine that is coupled to the internal combustion engine via a clutch device. The method comprises, during a phase for starting the internal combustion engine with the rotating electric machine while the vehicle is rolling, controlling the clutch device by means of a maximum clutch torque setpoint which is determined according to a predetermined maximum engine speed gradient of the internal combustion engine and of a moment of inertia of the internal combustion engine, and controlling the internal combustion engine by means of a maximum internal combustion engine torque setpoint which is determined according to a difference between the maximum clutch torque setpoint and a torque transmitted by the clutch device.

According to one particular feature, the torque transmitted by the clutch device is obtained by estimation.

Also disclosed herein is a computer comprising a memory storing program instructions for implementing the method briefly described above. This computer is, for example, an engine control unit of the vehicle.

Also disclosed herein is an electric hybrid vehicle having a powertrain comprising an internal combustion engine and a hybrid transmission system, the hybrid transmission system having a rotating electric machine coupled to the internal combustion engine via a clutch device, the powertrain having a phase for starting the internal combustion engine with the rotating electric machine while the vehicle is rolling. The method comprises a computer as described above for controlling the starting phase.

According to one particular embodiment, the hybrid transmission system of the electric hybrid vehicle comprises a dual-clutch transmission.

BRIEF DESCRIPTION OF THE FIGURES

Further advantages and features will become more clearly apparent from the following detailed description of a number of particular embodiments, with reference to the accompanying drawings, in which:

FIG. 1 is a block diagram schematically showing an architecture of a powertrain of an electric hybrid vehicle equipped with a dual-clutch hybrid transmission system.

FIG. 2 is a function block diagram showing one implementation of the method in the powertrain of FIG. 1.

FIG. 3 shows various curves demonstrating the benefits provided by implementing the method in the powertrain of FIG. 1.

DETAILED DESCRIPTION

With reference to FIG. 2 and to FIG. 3, one particular embodiment of the method is now described. Here, the method is implemented in a hybrid powertrain, such as the powertrain eGMP of FIG. 1, comprising an internal combustion engine and an "eDCT" dual-clutch hybrid transmission system, which are labeled MT and eTR, respectively.

Generally speaking, the method uses the below known relationships (1) and (2) to link the engine speed gradient (expressed in $rpm \cdot s^{-1}$) to the internal combustion engine torque (expressed in N·m), knowing the moment of inertia (expressed in $kg \cdot m^2$) of the internal combustion engine, namely:

(1) Co=(J·dω/dt), where Co is the torque (in N·m), J is the moment of inertia (in $kg \cdot m^2$), ω is the angular velocity (in $rd \cdot s^{-1}$) and dω/dt is the angular acceleration (in $rd \cdot s^{-2}$); and $$1 \text{ rpm} = 120\pi \text{ rd} \cdot S^{-1}. \quad (2)$$

The method comprises a prior test phase on the internal combustion engine MT and a phase of using the method to start the internal combustion engine MT while the vehicle is rolling.

The purpose of the prior test phase is to determine, using open-loop control, a maximum engine speed gradient LGR, i.e. an engine speed gradient which is close to, but below, an organic limit of the internal combustion engine MT. The determined maximum engine speed gradient LGR is stored in memory, for example in the engine control unit ECU_E in this instance, for subsequent use in controlling the starting of the internal combustion engine MT while the vehicle is rolling.

In the phase of using the method to start the internal combustion engine MT, the rotating electric machine ME delivers an electric motor torque Cme the clutch device K0. Typically, the electric motor torque Cme has a constant value throughout the start-up period. The clutch device K0 is controlled with a maximum clutch torque setpoint C0*c* which is determined by the maximum engine speed gradient LGR and the moment of inertia of the internal combustion engine, and the internal combustion engine MT is controlled with a maximum engine torque setpoint CM which is dependent on a difference EC between the maximum engine speed gradient LGR and a measured engine speed gradient, and on a clutch torque C0*e* which is an estimate of the torque C0 actually transmitted by the clutch device K0.

With particular reference to FIG. 2, an embedded engine control software system SWEN is typically hosted in the engine control unit ECU_E dedicated to management of the engine MT.

The embedded engine control software system SWEN is implemented in a memory MEM of the control unit ECU_E. The software system SWEN comprises a number of software modules dedicated to the implementation of various control strategies for the engine MT, which are activated according to vehicle situations. The software system SWEN comprises in particular a software module M_CD responsible for managing the starting of the internal combustion engine MT.

The software module M_CD allows the method to be implemented through the execution of program code instructions by a processor (not shown) of the control unit ECU_E. The control unit ECU_E, under the supervision of the software module M_CD, cooperates in particular with the supervisory control unit ECU_S and the transmission control computer ECU_T to implement the method.

As can be seen in FIG. 2, the software module M_CD comprises two functional blocks in particular, M_EB and M_MT.

The functional block M_EB is responsible for determining the maximum clutch torque setpoint C0*c* for controlling the clutch device K0 and essentially comprises a function CE. The function CE is a calculation function which determines the maximum clutch torque setpoint C0*c* to be delivered to clutch device K0 based on the above-mentioned maximum engine speed gradient LGR and the moment of inertia Jmth of the internal combustion engine. In particular, the function CE uses the above-mentioned general relationships (1) and (2) to determine the maximum clutch torque setpoint C0*c*.

The maximum clutch torque setpoint C0*c* is delivered to the transmission control unit ECU_T to control the clutch device K0. The control unit ECU_T hosts a functional block M_K0 in memory which is responsible for controlling the clutch device K0, and comprises in particular a control function M_CC0 and an estimation function M_C0*e*. The function M_CC0 receives as input the maximum clutch torque setpoint C0*c* and a torque estimate C0*e* delivered by the estimation function M_C0*e*. The torque C0*e* is an estimate of the actual clutch torque C0 delivered to the internal combustion engine MT by the clutch device K0. The function M_CC0 delivers as output a closed-loop command C_C0. The closed-loop command C_C0 controls the clutch device K0 to deliver the required torque C0.

The functional block M_MT of the software module M_CD is responsible for determining the maximum engine torque setpoint CM for controlling the internal combustion engine MT. In particular, the functional block M_MT comprises functions S1 and CT.

The function S1 is a subtraction operator which provides a difference EC between the maximum clutch torque setpoint C0*c* and the actual clutch torque C0 delivered by the clutch device K0, the torque C0 being represented here by its estimate C0*e*. The torque difference EC is delivered as input to the function CT.

The function CT is a control function which determines the maximum engine torque setpoint CM according to the torque difference EC, applying gain adjustment and phase correction processing if necessary.

The contribution of the method over the prior art when starting the internal combustion engine MT while it is rolling is illustrated by the curves in FIG. 3.

Start-up comprises different phases for the internal combustion engine MT and for the clutch device K0, which are designated M1 to M3 and E1 and E2. Phases M1, M2 and M3 correspond to a start-up launch phase, a ramp-up phase and a torque transfer phase, respectively. Phases E1 and E2 correspond to a clutch slipping phase and a clutch closing phase, respectively.

Curves C1, C2 and C3 show changes in torque (C) during start-up, i.e. the constant torque Cme delivered by the rotating electric machine ME and the torque C0 transmitted via the clutch device K0. Curves C2 and C3 show the torques C0 for a start-up according to the prior art and a start-up, respectively. Curves C4 and C5 show changes in rotational speed (VR) during start-up, i.e. the rotational speed of the rotating electric machine ME and the rotational speed of the primary drive shaft, respectively. Curves C6 and C7 show changes in the speeds RM of the internal combustion engine for a start-up according to the prior art and for a start-up, respectively. Curves C8 and C9 show changes in engine speed gradient (GRD) during start-up, i.e. engine speed gradients for a start-up according to the prior art and for a start-up, respectively. The straight line C10 represents the limit corresponding to the maximum engine speed gradient LGR.

The effect of the method on the engine speed gradient and on the change C7 in the engine speed RM is represented schematically by the arrows F1 and F2. With the method, the corresponding gradient curve C9 remains below the set maximum engine speed gradient limit LGR. Compared with the prior art (curve C6), which accepts an engine speed gradient well in excess of LGR to achieve a short start-up time DD, the method (curve C7) achieves a substantially equivalent start-up time while observing the limit LGR.

Described herein is a low-cost, software-based solution for optimizing the rolling start-up of the internal combustion engine in a hybrid vehicle. The proposed solution is particularly suitable for MHEVs.

The foregoing methods and devices are not limited to the particular embodiments described here by way of example. Depending on the application, the skilled person will be able to make various modifications and variants falling within the scope of protection.

The invention claimed is:

1. A method for controlling the starting of an internal combustion engine implemented in an electric hybrid vehicle having a powertrain comprising said internal combustion engine and a hybrid transmission system, said hybrid transmission system having a rotating electric machine that is coupled to said internal combustion engine via a clutch device, wherein the method comprises, during a phase for starting said internal combustion engine with said rotating electric machine while said vehicle is rolling, controlling said clutch device by means of a maximum clutch torque setpoint which is determined according to a predetermined maximum engine speed gradient of said internal combustion engine and a moment of inertia of said internal combustion engine, and controlling said internal combustion engine by means of a maximum internal combustion engine torque setpoint which is determined according to a difference between said maximum clutch torque setpoint and a torque transmitted by said clutch device.

2. The method as claimed in claim 1, wherein said torque transmitted by said clutch device is obtained by estimation.

3. A computer comprising a non-transitory memory storing program instructions for implementing the method as claimed in claim 1.

4. The computer as claimed in claim 3, wherein said computer is an engine control unit.

5. An electric hybrid vehicle comprising the computer as claimed in claim 3, said powertrain having a phase for starting said internal combustion engine with said rotating electric machine while said vehicle is rolling, wherein said computer controls said starting phase.

6. The electric hybrid vehicle as claimed in claim 5, wherein said hybrid transmission system comprises a dual-clutch transmission.

* * * * *